United States Patent
Ishizeki et al.

(10) Patent No.: US 10,183,554 B2
(45) Date of Patent: Jan. 22, 2019

(54) VEHICULAR AIR CONDITIONING DEVICE

(71) Applicant: SANDEN HOLDINGS CORPORATION, Isesaki-shi, Gunma (JP)

(72) Inventors: Tetsuya Ishizeki, Isesaki (JP);
Takayuki Matsumura, Isesaki (JP);
Taichi Fujita, Isesaki (JP); Yoshihito Chabata, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 0 days.

(21) Appl. No.: 15/324,784

(22) PCT Filed: Mar. 17, 2015

(86) PCT No.: PCT/JP2015/057792
§ 371 (c)(1),
(2) Date: Jan. 9, 2017

(87) PCT Pub. No.: WO2016/006278
PCT Pub. Date: Jan. 14, 2016

(65) Prior Publication Data
US 2017/0197492 A1    Jul. 13, 2017

(30) Foreign Application Priority Data

Jul. 10, 2014  (JP) .................. 2014-142448

(51) Int. Cl.
*B60H 1/32* (2006.01)
*F25B 27/00* (2006.01)
*F25B 49/02* (2006.01)

(52) U.S. Cl.
CPC ............ *B60H 1/3214* (2013.01); *B60H 1/32* (2013.01); *B60H 1/323* (2013.01); *B60H 1/3208* (2013.01);

(Continued)

(58) Field of Classification Search
CPC .......... B60H 2001/3294; B60H 1/3222; B60H 1/3214; B60H 1/3208; B60H 1/323
See application file for complete search history.

(56) References Cited

U.S. PATENT DOCUMENTS 6,287,081 B1 *  9/2001  Tamegai ............... B60H 1/3208
                                                       417/15
2002/0157412 A1  10/2002  Iwanami et al.

FOREIGN PATENT DOCUMENTS

JP         62-061819 A      3/1987
JP       2003-042073 A      2/2003
(Continued)

OTHER PUBLICATIONS

Japan Patent Office, International Search Report issued in International Application No. PCT/JP2015/057792, dated Jun. 16, 2015.

(Continued)

*Primary Examiner* — Larry Furdge
(74) *Attorney, Agent, or Firm* — Baker Botts L.L.P.

(57) ABSTRACT

An air conditioning refrigerant circuit (6) includes an engine-driven compressor (7) and an electric compressor (11), which are arranged in parallel. When the engine is running, the engine-driven compressor (7) is used. When the engine stops, e.g., when idling stops, the electric compressor (11) is used. At the startup of the engine by a manual operation such as ignition by a key, the engine-driven compressor (7) is kept at rest and instead, the electric compressor (11) is operated for a predetermined time. After the predetermined time, the engine-driven compressor (7) is operated. In this way, the oil recovery to the electric compressor is promoted.

2 Claims, 3 Drawing Sheets

(52) U.S. Cl.
CPC ........... *B60H 1/3222* (2013.01); *F25B 27/00* (2013.01); *F25B 49/022* (2013.01); *B60H 2001/3292* (2013.01); *B60H 2001/3294* (2013.01); *F25B 2327/001* (2013.01); *F25B 2400/075* (2013.01); *F25B 2600/01* (2013.01); *F25B 2600/0251* (2013.01); *F25B 2600/0253* (2013.01)

(56) References Cited

FOREIGN PATENT DOCUMENTS

| | | |
|---|---|---|
| JP | 2003-205731 A | 7/2003 |
| JP | 2004-237907 A | 8/2004 |

OTHER PUBLICATIONS

Japan Patent Office, Notification of Reasons for Refusal issued in Japanese Patent Application No. 2014-142448, dated May 29, 2018.

\* cited by examiner

VEHICULAR AIR CONDITIONING DEVICE

CROSS-REFERENCE TO RELATED APPLICATIONS

This application is a U.S. National Stage Patent Application under 37 U.S.C. § 371 of International Patent Application No. PCT/JP2015/057792, filed on Mar. 17, 2015, which claims the benefit of Japanese Patent Application No. JP 2014-142448, filed on Jul. 10, 2014, the disclosures of each of which are incorporated herein by reference in their entirety.

TECHNICAL FIELD

The present invention relates to a vehicular air conditioning device and more particularly to a vehicular air conditioning device equipped with two compressors for compressing refrigerant, i.e., an engine-driven compressor and a motor-driven compressor.

BACKGROUND ART

In general, vehicular air conditioning devices use the engine-driven compressor. However, if a vehicle has an idling stop function that automatically stops the engine under a predetermined idling stop condition like waiting at a traffic light, etc., when the vehicle has stopped idling, the engine-driven compressor also stops operating. Consequently, the air conditioning device becomes incapable of cooling when idling stops.

To deal with this problem, a motor-driven compressor may be provided in parallel with the engine-driven compressor in a refrigerant circuit as disclosed in Patent Document 1. In such configuration, the engine-driven compressor is used when the engine is operating, whereas the motor-driven compressor is used when the engine stops (when idling stops).

REFERENCE DOCUMENT LIST

Patent Document

Patent Document 1: JP 2003-042073 A

SUMMARY OF THE INVENTION

Problems to be Solved by the Invention

Often, the refrigerant is mixed with lubricating oil for lubricating internal parts of the compressor. The compressor is equipped with the oil separator function that allows separation of oil from the refrigerant so as to reduce oil leakage from the discharge side of the compressor toward the refrigerant circuit. However, despite such arrangement, oil leakage to the refrigerant circuit is inevitable.

The oil leaking from the discharge side of the compressor to the refrigerant circuit circulates through the refrigerant circuit and then flows back to the intake side of the compressor. When operating with a low flow rate of refrigerant, the refrigerant cannot wash away the oil in the refrigerant circuit and the oil is retained there and thus is harder to flow back to the compressor. In particular, since the motor-driven compressor is used only when idling stops, high output is rarely required and the compressor is operated with a low flow rate of the refrigerant. Thus, oil recovery is significantly lowered.

As mentioned above, the motor-driven compressor has a problem that the oil in the compressor gradually reduces and the compressor cannot be lubricated enough, worsening its durability. Note that the technique disclosed in Patent Document 1 operates the motor-driven compressor regularly only for a predetermined time when the engine-driven compressor is operating. However, such parallel running is intended to share the flow rate and is accordingly unable to increase the flow rate of refrigerant returning to the motor-driven compressor. On this account, high oil recovery cannot be expected.

The present invention has been accomplished in view of the foregoing, and an object of the present invention is to improve oil recovery to a motor-driven compressor so as to enhance the durability of the motor-driven compressor.

Means for Solving the Problems

In order to achieve the above object, the present invention is directed to a control device configured to control operations of an engine-driven compressor and a motor-driven compressor so as to let the engine-driven compressor stay and let the motor-driven compressor operate for a predetermined time at rest at the startup of an engine, and subsequently let the engine-driven compressor operate.

Effects of the Invention

In the summer or the like that raises the necessity for cooling a vehicle cabin, high output is required of the air conditioning device at the startup of engine, especially, startup by a manual operation such as ignition by a key because the internal temperature of the vehicle may be high, etc. Hence, if the motor-driven compressor is temporarily operated only at the startup without letting the engine-driven compressor operate, the motor-driven compressor is given the opportunity to operate at high output. As a result, oil can flow back to the motor-driven compressor and a sufficient amount of oil is ensured in the motor-driven compressor so as not to affect its durability.

MODE FOR CARRYING OUT THE INVENTION

Below, an embodiment of the present invention will be described in detail with reference to the accompanying drawings.

Figure 1:
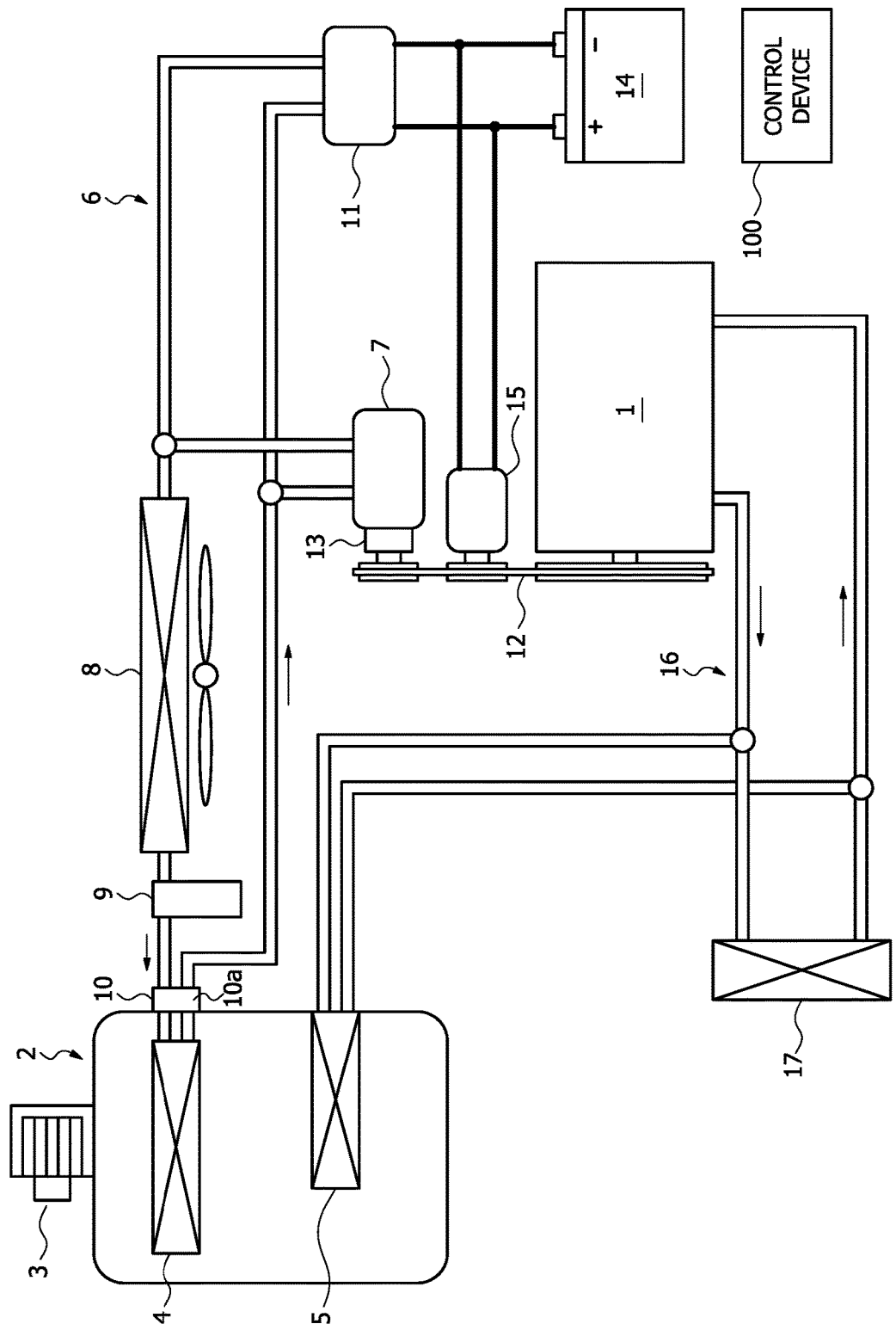
FIG. 1 is a schematic diagram showing a vehicular air conditioning device according to an embodiment of the present invention.

FIG. 1 is a schematic diagram showing a vehicular air conditioning device according to the embodiment of the present invention. The vehicular air conditioning device of this embodiment is adopted in an idling stop vehicle that uses an engine (internal combustion engine) 1 as its driving source and has the function of automatically stopping the engine 1 under predetermined idling stop conditions like waiting at a traffic light, etc.

An HVAC (Heating Ventilation and Air Conditioning) unit 2 is installed in a vehicle cabin and configured to take in the air inside the vehicle (internal air) or the air outside the vehicle (external air) and blow it in the vehicle cabin after appropriate conditioning. The HVAC unit 2 includes a blower 3 that takes in the internal or external air and sends it out, an evaporator 4 as a heat exchanger for cooling disposed at an air-blowing path for supplying the air from the blower 3, a heater core 5 as a heat exchanger for heating disposed at a portion of an air-blowing path in the horizontal direction downstream of the evaporator 4, and an air diffuser (not shown) through which the air conditioned by heat exchange with the evaporator 4 or heater core 5 is blowing. The air diffuser includes a defroster diffuser, a face diffuser, and a foot diffuser.

A refrigerant circuit 6 serves to circulate fluorocarbon refrigerant and includes the above evaporator 4, an engine-driven compressor 7 connected to an outlet pipe of the evaporator 4, and a condenser 8 connected to an outlet pipe of the engine-driven compressor 7. The outlet pipe of the condenser 8 is connected to the evaporator 4 via a liquid receiver 9 and an expansion valve 10.

The liquid receiver 9 temporarily retains the refrigerant and supplies only liquid refrigerant. As is called RD (receiver dryer), the liquid receiver 9 contains a drying agent to remove water content mixed in the refrigerant. The expansion valve 10 is placed at the inlet of the evaporator 4 and configured to decompress the refrigerant flowing in the evaporator 4. The expansion valve 10 is integrally provided with a detecting unit 10a for detecting the temperature and pressure at the outlet of the evaporator 4.

The refrigerant circuit 6 further includes a motor-driven compressor (hereinafter referred to as "electric compressor") 11 placed in parallel with the engine-driven compressor 7.

The engine-driven compressor 7 is driven by the engine 1 by means of pulleys and a belt 12. The engine-driven compressor 7 also includes a clutch 13 interposed between the pulley driven by the engine 1 and the drive shaft of the compressor 7.

The electric compressor 11 incorporates an electric motor and is driven by the motor. The motor is supplied with electric power by a battery 14. The battery 14 is charged by an alternator 15 that is belt-driven by the engine 1.

An engine cooling water circuit 16 circulates cooling water between the engine 1 (water jacket thereof) and a radiator 17. In this configuration, the above heater core 5 is disposed in parallel with the radiator 17. Accordingly, in the HVAC unit 2, the heater core 5 can heat the air by passing it through engine cooling water (cooling water that is heated after cooling the engine 1) used as a heating medium.

During the cooling operation of the above vehicular air conditioning device, the refrigerant in the refrigerant circuit 6 is compressed by the engine-driven compressor 7 or the electric compressor 11, condensed by the condenser 8, expanded by the expansion valve 10, and vaporized by the evaporator 4, and then flows back to the compressor 7 or 11. Thus, in the HVAC unit 2, the evaporator 4 removes vaporization heat from the air past the unit, hereby cooling the air. The air cooled by the evaporator 4 blows out from an appropriate air diffuser and serves for cooling the vehicle cabin.

Next, the idling stop vehicle is described. The idling stop vehicle automatically stops the engine under a predetermined idling stop condition like waiting at a traffic light, etc. and after the idling stop, automatically starts the engine with a starter motor under a predetermined idling stop cancelling condition such as a driver's operation executed to start moving the vehicle.

The idling stop condition indicates, for example, that the following conditions (1) to (3) are satisfied:

(1) Vehicle speed=0
(2) The gear is at a non-drive position (neutral position) or the clutch is disengaged (a clutch pedal is depressed (switched ON))
(3) A braking pedal is depressed (switched ON)

The idling stop cancelling condition indicates, for example, that any one of the following conditions (1) to (3) is satisfied:

(1) The gear is shifted to a drive position
(2) The clutch is shifted to engagement (the clutch pedal is released (switched OFF))
(3) The braking pedal is released from being depressed (switched OFF)

Needless to say, the foregoing conditions are given merely as an example and the other conditions can be adopted instead (or in combination with the above).

In the idling stop vehicle, the engine 1 is operating during the normal running. At that time, the engine-driven compressor 7 serves to compress the refrigerant. In contrast, when idling stops, the engine 1 stops and thus the electric compressor 11 serves to compress the refrigerant. As mentioned above, however, since the electric compressor 11 is used only when idling stops, high output is rarely required and the compressor is used with a low flow rate of the refrigerant. Thus, oil recovery to the electric compressor 11 is lowered.

To deal with the above problem, in this embodiment, at the startup of the engine, especially, startup by a manual operation such as ignition by a key, the engine-driven compressor 7 is kept at rest and the electric compressor 11 is operated for a predetermined time, after which the engine-driven compressor 7 is operated. As a result, the electric compressor 11 is given the opportunity to operate at high output, and oil can flow back to the electric compressor 11. Such startup control is executed by a control device 100 in FIG. 1. The control device 100 is an air-conditioning control device, which has, of course, the function of controlling the operations of the engine-driven compressor 7 and electric compressor 11.

Figure 2:
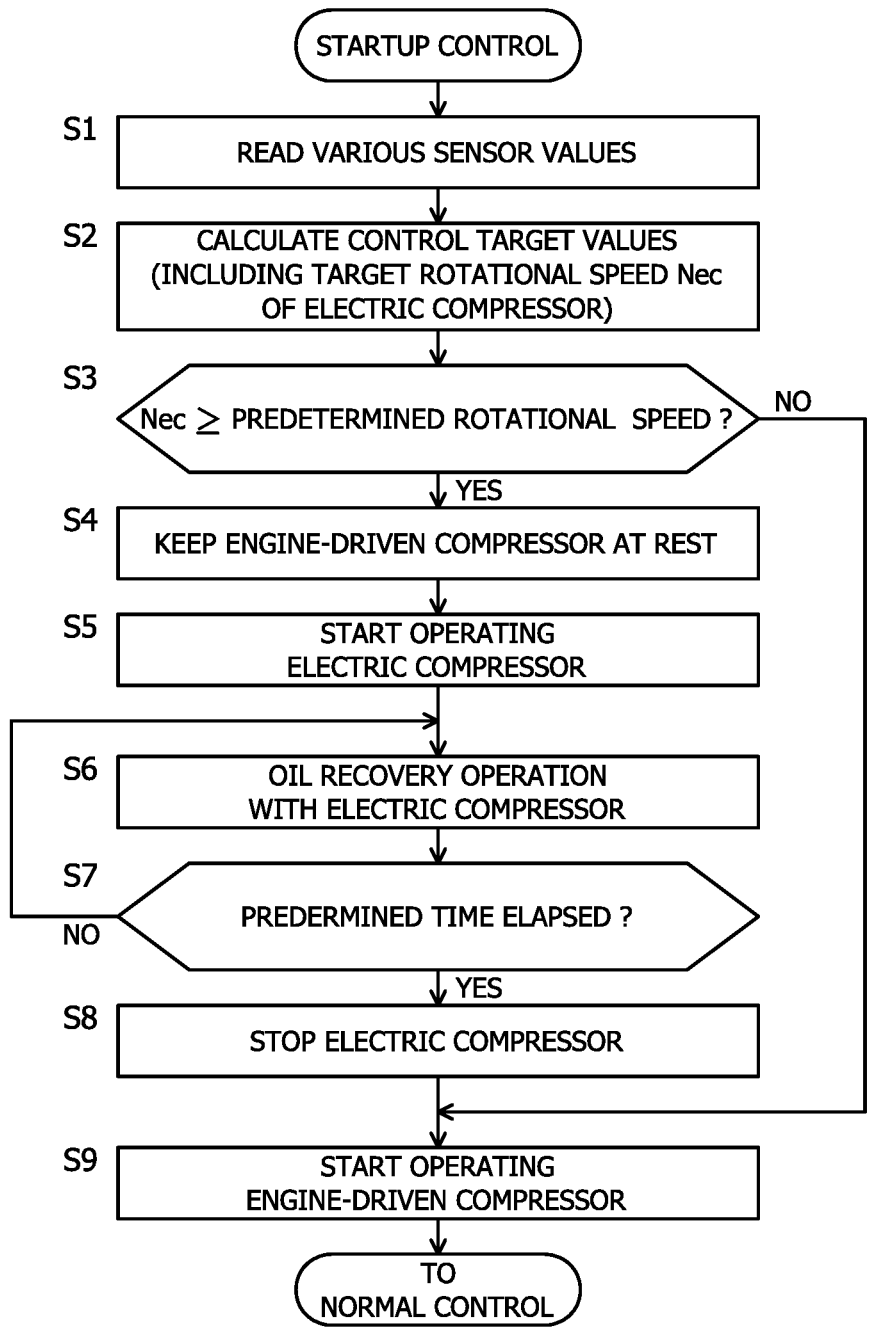
FIG. 2 is a flowchart of startup control.

FIG. 2 is a flowchart of startup control with the control device 100. This flow is performed when the engine is started by a driver with such an operation as manual turning of an ignition key. Along with the start of this flow, the engine 1 starts operating and the alternator 15 is also turned ON.

In S1, various sensor values for air-conditioning control are read. More specifically, the internal air temperature and humidity, the external air temperature and humidity, an amount of sunlight, a battery voltage, etc. are read.

In S2, control target values are determined by calculation based on the air conditioning load calculated from the various sensor values. More specifically, the target blowing temperature, the target blower flow rate, and the like are calculated. Moreover, the target rotational speed Nec (the target number of rotations per unit time) of the electric compressor 11 is also calculated.

In S3, the target rotational speed Nec of the electric compressor 11 is compared with the predetermined rotational speed to determine if Nec≥predetermined rotational speed. The predetermined rotational speed is a threshold value for determining whether the electric compressor 11 is operated with high output enough for oil to flow back.

If Nec≥predetermined rotational speed, the processing advances to S4. In S4, the clutch 13 of the engine-driven compressor 7 is disengaged. Thus, regardless of whether the engine 1 is operating, the engine-driven compressor 7 is kept at rest. In S5, the electric compressor 11 starts operating. The power supply to the electric compressor 11 is performed by the engine-driven alternator 15 so as to save power consumption of the battery 14.

In S6, the electric compressor 11 continues operating to perform "oil recovery operation". The "oil recovery operation" indicates an operation at the rotational speed (Nec) corresponding to the air conditioning load. Moreover, the air conditioning load is set not to save power consumption but to ensure high output control. For example, during the power-saving control, the evaporator outlet temperature is set at, for example, 10° C. In contrast, during the oil recovery control, the evaporator outlet temperature is set at, for example, 3° C.

During the oil recovery operation of the electric compressor 11, it is determined whether a predetermined time has elapsed in S7. If the predetermined time has not elapsed, the processing returns to S6 to continue the oil recovery operation with the electric compressor 11.

After the predetermined time has elapsed, the processing advances from S7 to S8. In S8, the electric compressor 11 is stopped. Then, the processing advances to S9 to engage the clutch 13 of the engine-driven compressor 7 to start operating the engine-driven compressor 7. Upon the switchover from the electric compressor 11 to the engine-driven compressor 13, the vehicle is shifted to a battery charging priority mode for charging the battery 14 with the alternator 15.

On the other hand, if Nec<predetermined rotational speed in S3, the processing advances to S9 skipping S4 to S8. Concurrently with the startup of the engine 1, the engine-driven compressor 7 starts operating. If the target rotational speed Nec of the electric compressor 11 at the startup is less than the predetermined rotational speed, there is a possibility that the flow rate of the refrigerant is insufficient and a sufficient amount of oil cannot be recovered. Therefore, unless the target rotational speed Nec of the electric compressor 11 is equal to or greater than the predetermined rotational speed, the electric compressor 11 is not operated and instead, the engine-driven compressor 7 is operated.

After the engine-driven compressor 7 starts operating in S9, the processing shifts to normal control.

Figure 3:
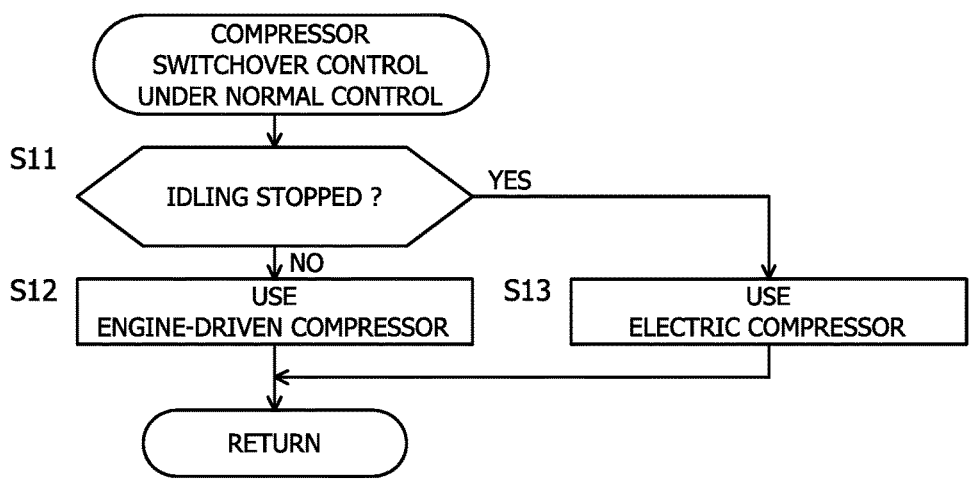
FIG. 3 is a flowchart of a compressor switchover control routine under normal control.

FIG. 3 is a flowchart of a compressor switchover control routine under normal control. In S11, it is determined whether the vehicle has stopped idling. If the vehicle has not stopped idling, that is, the engine is operating, the processing advances to S12. In S12, the electric compressor 11 is stopped and the engine-driven compressor 7 is used (the clutch 13 is engaged (turned ON)). When idling has stopped, that is, the engine stops, the processing advances to S13. In S13, the engine-driven compressor 7 is stopped and thus, the electric compressor 11 is used instead.

According to this embodiment, the engine-driven compressor 7 and the electric compressor 11 are provided. When the engine is operating, the engine-driven compressor 7 is used. When the engine stops, the electric compressor 11 is used. Therefore, even when the engine stops, the refrigerant can be circulated for cooling.

According to this embodiment, at the startup of the engine, the engine-driven compressor 7 can be kept at rest while the electric compressor 11 is operated for a predetermined time, after which the engine-driven compressor 7 is operated. As a result, the oil can flow back to the electric compressor 11 and then a sufficient amount of oil is ensured in the electric compressor 11 so as not to affect its durability. That is, in the summer or the like that raises the necessity for cooling the vehicle cabin, high output is required of the air conditioning device at the startup of engine, especially, startup by a manual operation such as ignition by a key because the internal temperature of the vehicle may be high, etc. At this time, the electric compressor 11 is temporarily operated without letting the engine-driven compressor 7 operate, whereby the electric compressor 11 is given the opportunity to operate at high output. As a result, oil can flow back to the electric compressor 11 and the durability of the electric compressor 11 can be improved.

Moreover, according to this embodiment, at the startup of the engine, when the electric compressor 11 is operating, the electric compressor 11 is driven at the rotational speed (Nec) corresponding to the air conditioning load. Hence, the electric compressor 11 is given the opportunity to surely operate at high output.

In addition, according to this embodiment, if the target rotational speed (Nec) corresponding to the air conditioning load is less than the predetermined rotational speed, at the startup of the engine, the engine-driven compressor 7 is operated without letting the electric compressor 11 operate. This is to save wasteful consumption of the battery because, in this case, there is a high possibility that the flow rate of the refrigerant is insufficient and oil cannot be recovered enough.

It should be noted that in the above description, the electric compressor 11 is operated for the predetermined time in order to ensure the oil recovery to the electric compressor 11 at the startup of the engine by a manual operation such as ignition by a key. Besides the above configuration, the electric compressor 11 can be operated for the predetermined time also when the engine is automatically resumed from an idling stop mode. Moreover, it is needless to say that the startup by a manual operation such as ignition by a key includes the engine startup with various starting buttons of keyless systems.

Furthermore, it is a matter of course that the illustrated embodiment is only intended to exemplify the present invention, and in addition to those directly shown by the described embodiments, the present invention includes various improvements and modifications that can be made by one skilled in the art within the scope of the claims.

REFERENCE SYMBOL LIST 1 engine
2 HVAC unit
3 blower
4 evaporator
5 heater core
6 refrigerant circuit
7 engine-driven compressor
8 condenser
9 liquid receiver
10 expansion valve
11 electric compressor
12 belt
13 clutch
14 battery
15 alternator
16 engine cooling water circuit
17 radiator
100 control device

The invention claimed is:
1. A vehicular air conditioning device comprising:
two compressors including an engine-driven compressor and a motor-driven compressor; and
a control device for controlling operations of the two compressors, the engine-driven compressor being used when an engine is running and the motor-driven compressor being used when the engine stops, wherein the control device is configured to let the motor-driven compressor operate for a predetermined time at the startup of the engine while keeping the engine-driven compressor at rest and subsequently let the engine-driven compressor operate, wherein the control device is further configured to, when the motor-driven compressor is operated at the startup of the engine, let the motor-driven compressor operate at a target rotational speed of the motor-driven compressor determined by calculation based on an air conditioning load, and wherein the control device is further configured to, when the target rotational speed of the motor-driven compressor is less than a predetermined rotational speed, let the engine-driven compressor operate without letting the motor-driven compressor operate at the startup of the engine.

2. The vehicular air conditioning device according to claim 1, wherein the vehicular air conditioning device is applied to an idling stop vehicle that automatically stops the engine under a predetermined idling stop condition, and the startup of the engine at which the motor-driven compressor is operated for the predetermined time is engine startup by a manual operation.

* * * * *